United States Patent
Andersen et al.

(10) Patent No.: US 8,020,693 B2
(45) Date of Patent: Sep. 20, 2011

(54) BELT LINK WITH HALF THE SURFACE INCLINED

(75) Inventors: Kenneth Westergaard Andersen, Vejle (DK); Peter Broe, Løsning (DK)

(73) Assignee: uni-chains A/S, Vejle (DK)

( * ) Notice: Subject to any disclaimer, the term of this patent is extended or adjusted under 35 U.S.C. 154(b) by 363 days.

(21) Appl. No.: 12/152,466

(22) Filed: May 14, 2008

(65) Prior Publication Data

US 2009/0283388 A1 Nov. 19, 2009

(30) Foreign Application Priority Data

May 14, 2007 (DK) .................................. 2007 00721

(51) Int. Cl.
*B65G 17/06* (2006.01)

(52) U.S. Cl. ........................................ 198/850; 198/853
(58) Field of Classification Search ........... 198/850–853
See application file for complete search history.

(56) References Cited

U.S. PATENT DOCUMENTS

| 268,883 | A | * | 12/1882 | Gowan | 474/234 |
| 1,029,566 | A | * | 6/1912 | Witham | 198/822 |
| 3,785,476 | A | * | 1/1974 | Poerink | 198/853 |
| 4,167,999 | A | * | 9/1979 | Haggerty | 198/851 |
| 4,418,817 | A | * | 12/1983 | Martin et al. | 198/845 |
| 6,601,697 | B2 | * | 8/2003 | Steeber et al. | 198/844.1 |
| 2003/0019730 | A1 | | 1/2003 | Steeber et al. | |

* cited by examiner

*Primary Examiner* — Gene Crawford
*Assistant Examiner* — William R Harp
(74) *Attorney, Agent, or Firm* — James Creighton Wray

(57) ABSTRACT

A conveyor chain link has a leading edge, a trailing edge, two opposed side edges, a load carrying upper surface and a bottom face. The leading and trailing edges have pluralities of eye parts separated by openings, such that the trailing edge of one belt link may be arranged in the openings arranged on the leading edge of an adjacent belt link. The belt links are connected either by inserting a traverse rod through apertures in the eye parts or by fitting lateral notches in slots provided in sides of the eye parts on the opposite edge on the sides of the eye parts along one edge. Between the leading and trailing edges and the side edges at least a part of a load carrying surface has a one-sided inclination towards one side edge.

7 Claims, 2 Drawing Sheets

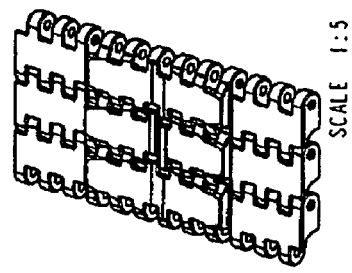
FIG. 3B
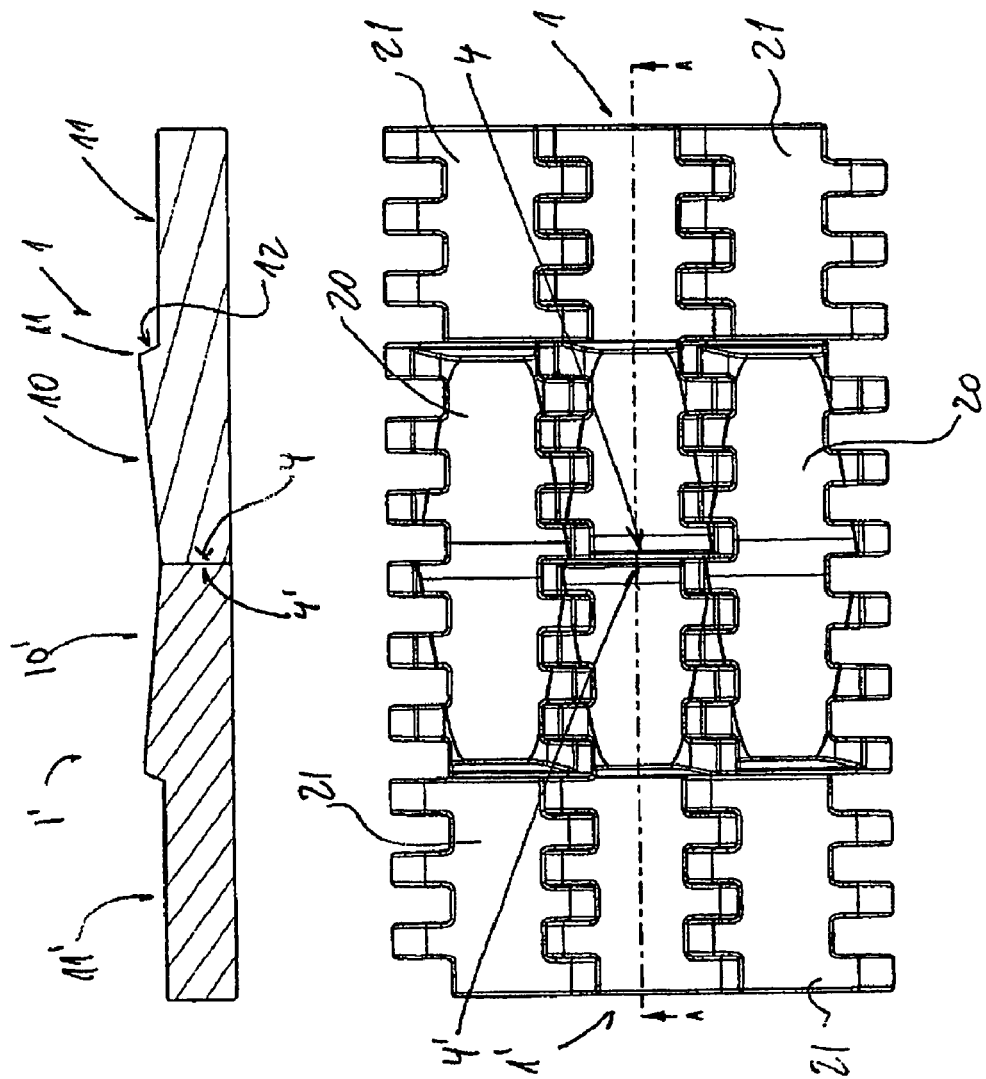
FIG. 2
FIG. 3A

BELT LINK WITH HALF THE SURFACE INCLINED

This application claims the benefit of Danish Application No. PA 2007 00721 filed May 14, 2007, which is hereby incorporated by reference in its entirety.

FIELD OF THE INVENTION

The present invention relates to a conveyor chain link as well as a conveyor belt built up of a number of such chain links.

BACKGROUND ART

In the art conveyors are used for a multitude of purposes and there are numerous specially designed chain links depending on the tasks at hand.

For one particular use special belt links are the most appropriate and the present invention is particularly directed to chain links for use in conveyors where cylindrical very large and/or heavy loads are to be transported on the conveyor. Such loads may include rolls of printing paper for printing presses, drums, but will not be limited to the mentioned products.

In order to transport this type of product the top surface of the belt has traditionally been shaped to accommodate and retain the products on the conveyor belt. The means for retaining the cylindrical objects have been inclined side surfaces or members added to the belt links in order to retain the objects.

An example of a prior art belt link is marketed by the applicant under the brand name uni XLB V4 or uni XLB V8. When these types of chain links are assembled to a conveyor belt it is possible to move very heavy loads and at the same time, due to the V-shape of the overside of the belt links forming a valley along the longitudinal direction of the conveyor, i.e. the transport direction, to maintain very heavy loads on the conveyor belts.

One problem, however, associated with these types of links is the fact that in order to carry the very heavy loads and thereby transfer the loads from chain link to chain link by means of transverse pins inserted through apertures arranged laterally in the eye parts of the belt links, the material thickness as well as material density around the eye parts have to be substantial in order to transfer the very heavy loads.

OBJECT OF THE INVENTION

It is therefore an object of the present invention to provide a chain link as well as a conveyor belt assembly where heavy loads may be transferred between adjacent chain links without substantially increasing the material thickness or density.

DESCRIPTION OF THE INVENTION

The present invention addresses this by providing a chain link where the link is defined by a leading edge, a trailing edge, two opposed side edges, a load carrying upper surface, and a bottom face, wherein along the leading edge is provided a plurality of eye parts separated by openings and where the link along the trailing edge is provided with a plurality of eye parts separated by openings, such that the eye parts on the trailing edge of one belt link may be arranged in the openings arranged on the leading edge of an adjacent belt link, and the belt links may be connected either by inserting a traverse rod through apertures provided in the lateral direction in the eye parts or by fitting lateral notches provided on the sides of the eye parts along one edge in slots provided on the sides of the eye parts on the opposite edge, and wherein between the leading and trailing edge and the side edges a load carrying surface is defined, where said surface at least for a part of the surface has a one sided inclination towards one side edge.

In this configuration it is possible to provide more eye parts over a wider distance perpendicular to the travelling direction of the conveyor belt such that the aggregated load from the objects carried on the conveyor belt and thereby the conveyor chain links will be distributed across more eye parts whereby the relative load per eye part and thereby also the impact on the transfers pin arranged to connect adjacent chain links in the belt will be lessened. Furthermore, by providing one-sided inclination on the belt links the size of the belt links may also be relatively small such that the manufacturing process does not involve very heavy and large injection moulding equipment with the additional costs involved.

In this context "inclination" shall be understood to include both a linear inclination, i.e. that the surface from the beginning to the end of the inclined portion is in one plane, and the surface may be curved, in particular describing a radius substantially corresponding to that of the objects to be conveyed on the conveyor belt. The curvature will normally be in a transverse direction relative to the transport direction.

In a further advantageous embodiment of the invention the loading surface has a flat section corresponding to substantially half the surface area, and where the other half of the loading surfaces area is inclined.

The flat section serves a number of purposes. When the inventive chain links according to the invention are assembled to a conveyor belt as will be discussed below the chain link will be exposed to loads both perpendicular to the surface of the chain link and in the same plane as the chain link. The first type of load derives from the object which is placed on the conveyor and the second type of load in the plane of the chain link arises from the pull in the conveyor belt created by the motor which is activated in order to propel the conveyor belt.

The vertical load will be transmitted by the chain link through the substructure. The larger the contact area is between the chain link and the substructure, the lesser the load per area unit has to be absorbed by the substructure. Therefore, the flat section in combination with the relatively stiff construction of the chain link will distribute the load placed on the conveyor surface to a larger area in the substructure and thereby minimize the impact on the substructure. The load in the direction of travel, i.e. in the plane of the conveyor will also be lessened in that as the flat section also is provided with eye parts and openings the eye parts available for transferring the load to an adjacent chain link is increased such that the load on each eye part will be lessened.

In a further advantageous embodiment of the invention the side edges have identical height, and where the inclination from a side edge towards the middle of the link is between 3° and 10° and more preferred between 5° and 8°.

By providing the side edges with identical height it becomes possible to combine chain links in a brick laying pattern without creating abrupt differences in height on the conveying surfaces and at the same time by providing the inclination at the intervals mentioned, a relatively flat valley is created between two adjacent chain links arranged as mirror images, but depending of the diameter of the object to be conveyed on the conveying surface tests have indicated that the relative shallow inclination does provide a very decisive support such that the objects may safely be conveyed on the conveying surface.

In a further advantageous embodiment this mirror image is created by using two chain links where the inclination on one is mirrored on the other, such that by assembling two chain links laterally the inclinations will form a valley. This effect is created for example by rotating one link relative to the other, such that the leading edge becomes the trailing edge on one and not the other link, or by providing two types of links where one is a mirror image of the other.

The invention furthermore relates to a conveyor belt per se built up of a number of chain links as described above. The belt is made from a number of hingely connected rows of chain links in the transport direction of the conveyor, where each row at least comprises two laterally arranged links as mentioned above, where the inclination of the at least two links in each row is towards each other whereby a valley in the transport direction of the conveyor is formed.

The belt link may also be one single element from side edge to side edge. In this embodiment each chain link comprises flat surface sections adjacent the side edges, and two mutually inclined surfaces forming a central valley in the intended transport direction.

The conveyor belt as well as the additional advantageous embodiments listed in the sub-claims provides the same advantages as already described above.

DESCRIPTION OF THE DRAWING

The invention will now be explained with reference to the accompanying drawing wherein

FIG. 2 illustrates a cross section between two links according to the invention

FIG. 3A illustrates a conveyor belt incorporating the inventive link according to the invention.

FIG. 3B is a perspective view of a conveyor belt incorporating the inventive links as shown in FIG. 3A.

DETAILED DESCRIPTION OF THE INVENTION

Figure 1A:
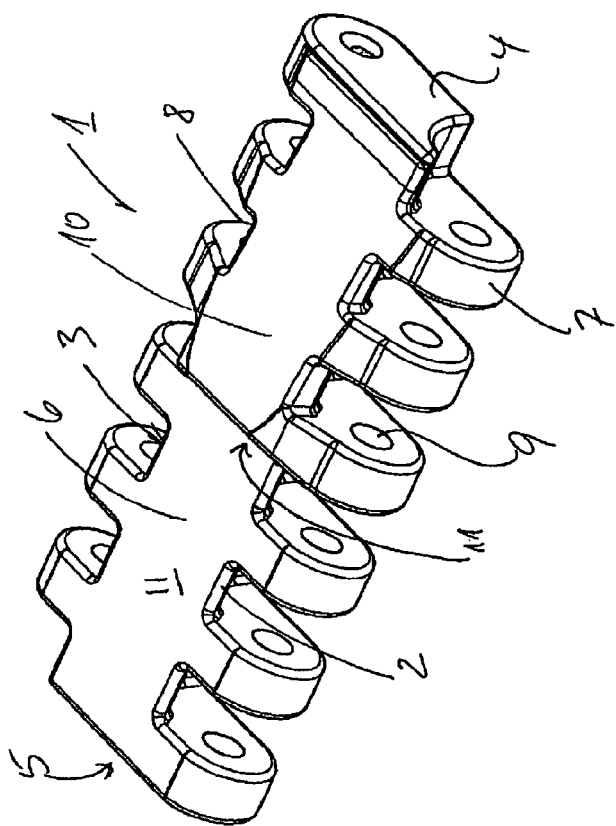
FIG. 1A illustrates a chain belt link according to the invention.
Figure 1B:
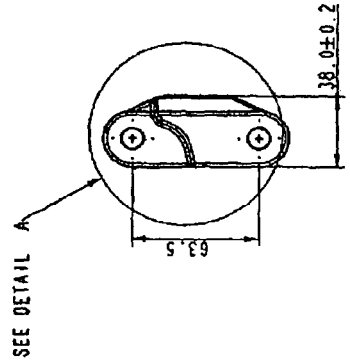
FIG. 1B is a side view of the chain belt link shown in FIG. 1A.
Figure 1C:
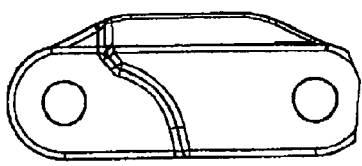
FIG. 1C is an enlarged view of FIG. 1B.
Figure 1D:
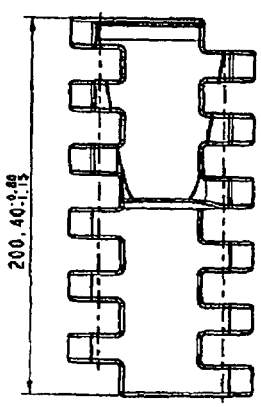
FIG. 1D is a top view of the of the chain belt link shown in FIG. 1A.
Figure 1E:
FIG. 1E is an end view of the of the chain belt link shown in FIG. 1A.

FIGS. 1A, 1B, 1C, 1D, 1E illustrate an embodiment of the invention in the shape of an injection moulded conveyor chain link 1. The chain link has a leading edge 2, a trailing edge 3, two opposed side edges 4, 5 which together define a load carrying surface 6. The bottom face of the chain link is not visible in the illustration. Along the trailing edge and the leading edge eye parts 7 separated by opening 8 are evenly distributed and offset such that an eye part along the leading edge 2 will fit inside the opening between two eye parts on the trailing edge on an adjacent chain link.

In order to hingely connect adjacent chain links the eye parts 7 are provided with apertures 9 in a lateral direction such that it is possible to insert the eye parts along the trailing edge of one chain link into the openings along the leading edge of an adjacent chain link and in this manner superpose the apertures 9 in the eye parts 7 and insert a transverse connecting rod through the apertures of the two adjacent links. In this manner a flexible connection is created between two adjacent chain links.

The traverse pins connecting adjacent belt links may be made from steel, and in particular stainless steel, plastic, reinforced plastics or other suitable material.

The upper surface 6 is provided with an inclined section 10 and a substantially flat section 11. The height of the side edges 4, 5 is identical, such that the inclination is even with a side edge score and then increases such that approximately in the centre of the chain link 1 it reaches its full height along the edge 11.

The edge may both be made as a sharp edge, but it is preferred to provide the edge with a radius, such that a "roundish" feature is provided. This is advantageous in that where paper or other not so hard products are conveyed, the edge will not indent the products, but also during moulding of the links, it is simpler, faster and easier to mould and eject objects not having sharp edges.

Turning to FIG. 2, a cross section through two chain links with reference to FIGS. 1A, 1B, 1C, 1D and 1E are illustrated. The chain links 1, 1' are mirror images such that the side edges 4, 4' having identical height are in abutment along the centre line of the conveyor belt created by the two laterally arranged chain links 1, 1'. The inclined sections 10, 10' together create a valley which is suitable to accommodate for example, a circular cylindrical member such as for example, a large roll of printing paper or the like. Between the inclined sections 10, 10' and the flat sections 11, 11' a step 12 is present which step 12 creates the edge 11. In this particular embodiment the angle of inclination is 6.45° relative to the horizontal.

FIGS. 3A and 3B illustrate an assembly of different types of chain belt links wherein the belt links according to the invention are coupled to the prior art belt links. The belt links 1, 1' are placed side by side as illustrated with reference to FIG. 2 such that the side edges 4,4' abut each other substantially along the centre line of the resulting belt.

In order to create a brick laying pattern prior art belt links are arranged in adjacent rows overlapping the side edge connection 4, 4' between the two links 1, 1' according to the invention. In order to create an even width belt, filler links 21 are provided on either side of the belt links 20.

By in this way being able to create a brick laying pattern a much stronger construction is achieved in that a vast number of eye parts are available in order to transfer the loads particularly in a plane parallel to the transport surface such that much heavier loads may be transported by conveyor belts of this type. Furthermore, the brick laying pattern having added strength also provides for a good load distribution to the sub-structure which again increases the loading capacity of the entire construction.

The invention has been explained with respect to one particular embodiment, but it should be clear to a person skilled in the art that variations of the invention may be contemplated within the scope of the appended claims.

The invention claimed is:

1. An apparatus comprising a least two conveyor chain links, each conveyor chain link comprising a leading edge, a trailing edge, two opposed side edges, a load carrying upper surface, and a bottom face, wherein the leading edge includes a plurality of eye parts separated by openings and the trailing edge includes a plurality of eye parts separated by openings, the eye parts having apertures such that the eye parts on the trailing edge of chain link may be arranged in the openings arranged in the leading edge of the adjacent chain link; the apparatus further comprising a plurality of hinge pins, wherein and the chain links may be connected by inserting hinge pin through said apertures provided in the lateral direction in the eye parts, wherein between the leading and trailing edge and side edges the load carrying upper surface is defined, where the load carrying upper surface has a flat section corresponding to substantially half of an area of said load carrying upper surface, and where another half of the area of the load carrying upper surface is inclined, wherein the two chain links are arranged laterally to each other, where the inclination one of the chain links is mirrored on the other chain link such that by assembling the two chain links laterally the inclinations form a valley; wherein the two chain links outer side edges comprise flat sections and the two chain links adjacent inner side edges and the two mutually inclined load carrying upper surfaces forming a central valley in the intended transport direction.

2. The apparatus according to claim 1, wherein the side edges have identical height, and where the inclination from a side edge towards the middle of the link is between 3° and 10°.

3. The apparatus according to claim 2, where in the inclination from side edge towards the middle of the links is between 5° and 8°.

4. The apparatus of claim 1, further comprising a conveyor chain comprising a plurality of said chain links, wherein the chain comprises a plurality of hingely connected rows of the chain links in the transport direction of the conveyor chain, where each row at least comprises two of the chain links laterally arranged where the inclinations of the at least two chain links in each row is towards each other whereby a valley in the transport direction of the conveyor is formed.

5. The apparatus according to claim 4, further comprising at least two additional chain links arranged laterally along either side of the conveyor chain, where said additional links have a generally flat surface.

6. The apparatus according to claim 4, wherein the chain links in one row are connected to the chain links in an adjacent row by means of one hinge pin inserted through apertures provided laterally in the eye parts of chain links, and where said hinge pin is made from steel, stainless steel, plastics, modified plastics, or carbon reinforced composite materials.

7. The apparatus according to claim 1, further comprising a conveyor chain comprising a plurality of said chain links, wherein the chain is made from a number of hingely connected rows of the chain links in the transport direction of the conveyor, where each of the rows comprises the at least two of the chain links.

* * * * *